United States Patent
Crowe

(10) Patent No.: US 9,227,265 B2
(45) Date of Patent: Jan. 5, 2016

(54) ELECTRODE-SUPPORTING ASSEMBLY FOR CONTACT-START PLASMA ARC TORCH

(71) Applicant: Thermacut, s.r.o., Uherske Hradiste (CZ)

(72) Inventor: George A. Crowe, Claremont, NH (US)

(73) Assignee: Thermacut, S.R.O., Uherske Hradiste (CZ)

( * ) Notice: Subject to any disclaimer, the term of this patent is extended or adjusted under 35 U.S.C. 154(b) by 580 days.

(21) Appl. No.: 13/675,174

(22) Filed: Nov. 13, 2012

(65) Prior Publication Data

US 2013/0126487 A1    May 23, 2013

Related U.S. Application Data

(60) Provisional application No. 61/562,569, filed on Nov. 22, 2011.

(51) Int. Cl.
*B23K 9/00* (2006.01)
*B23K 10/00* (2006.01)
*H05H 1/34* (2006.01)

(52) U.S. Cl.
CPC .............. *B23K 10/00* (2013.01); *H05H 1/34* (2013.01); *H05H 2001/3489* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,791,268 A * | 12/1988 | Sanders et al. | ........... | 219/121.57 |
| 4,902,871 A * | 2/1990 | Sanders et al. | ........... | 219/121.49 |
| 5,164,569 A * | 11/1992 | Porra et al. | ............... | 219/121.57 |
| 5,796,067 A * | 8/1998 | Enyedy et al. | ........... | 219/121.52 |
| 5,886,315 A * | 3/1999 | Lu et al. | ................... | 219/121.57 |
| 5,938,949 A * | 8/1999 | Enyedy et al. | ............. | 219/121.5 |
| 8,035,055 B2 * | 10/2011 | Twarog et al. | ........... | 219/121.41 |
| 8,089,025 B2 * | 1/2012 | Sanders | ................... | 219/121.49 |
| 8,115,136 B2 * | 2/2012 | Mather et al. | ............ | 219/121.57 |
| 2008/0217305 A1 * | 9/2008 | Sanders | ................... | 219/121.49 |
| 2011/0240608 A1 * | 10/2011 | Merrill et al. | ............ | 219/121.48 |

* cited by examiner

*Primary Examiner* — Dana Ross
*Assistant Examiner* — Renee L Miller
(74) *Attorney, Agent, or Firm* — Michael J. Weins; Jeffrey E. Semprebon

(57) ABSTRACT

An electrode-supporting assembly for a contact-start plasma arc torch has an insulator that partially houses an electrode, and employs a spring-loaded plunger to bias the electrode to a forward position. The spring is engaged between the plunger and a contact element attached to the insulator, and may conduct electrical current to the electrode. The plunger, spring, and contact element are retained in the insulator when the torch is opened to replace the electrode, which is a consumable part. The electrode and the plunger have axially-engagable mating surfaces to assure good thermal and electrical conductivity therebetween. Conductivity can be further enhanced by forming the plunger of silver or a silver-bearing alloy. In some embodiments, a passage through the insulator is partitioned into forward and rear chambers, with the plunger, spring, and contact element trapped in the rear chamber.

21 Claims, 6 Drawing Sheets

ELECTRODE-SUPPORTING ASSEMBLY FOR CONTACT-START PLASMA ARC TORCH

FIELD OF THE INVENTION

The present invention relates to contact-start plasma torches, and more particularly to a novel structure for providing electrical connection of a consumable electrode with a power supply.

BACKGROUND OF THE INVENTION

U.S. Pat. No. 4,791,268 teaches a contact-start plasma arc torch where the electrode is biased forward by a plunger which resides in an enclosed structure; this structure is formed such that a significant portion of the electrode is not exposed to gas flow which would enhance cooling, and there appears to be little gas flow past the plunger. Additionally, the contact between the plunger and the electrode is provided only across relatively small planar contact surfaces, which may be susceptible to reduced contact due to any unwanted material interposed between these surfaces.

U.S. Pat. Nos. 8,035,055 and 8,115,136 teach a variety of electrode configurations for contact-start plasma arc torches, as well as teaching a prior art electrode which employs a spring-loaded contact for the power supply for biasing the electrode toward its forward position. In the prior art device cited in these patents, the electrode and contact remain engaged at all times. In basic embodiments of the invention taught in these patents, a spring is positioned between the electrode and the contact to bias the electrode away from the contact. In these embodiments, the electrode directly engages the contact only when in its rear position, which is the position for sustaining the non-transferred pilot arc and the transferred cutting plasma arc. Unless the electrode includes the spring, the spring may be lost when the torch is opened to change the electrode.

Perhaps to avoid the possibility of springs being lost when the torch is opened to change the electrode, these patents also teach several embodiments that employ an electrode having a spring-loaded conductive element that is secured to the electrode, trapping the spring. Securing the conductive element and spring to the electrode requires that these components be replaced with the electrode, increasing expense of the electrode, which is a consumable part.

In still other embodiments, the electrode is installed via a bayonet-style connection where the spring is positioned behind the female section of the bayonet element and thus trapped in the assembly. The electrode is provided with the male portion of the connection and, when inserted and locked in position, this portion contacts the spring. In another embodiment, the spring is retained by a fixed ring which overlaps part of the spring and a pair of prongs are positioned so as to pass though the opening and engage the spring. Such a configuration provides limited contact. While these latter solutions overcome the expense of attaching the spring and a conductive element to the electrode, it complicates the structure of the electrode, again increasing expense of fabrication, and may limit air flow over the spring and the contacting portion of the electrode, thereby reducing cooling. These embodiments also appear to suffer from limited engagement between the spring and the electrode, thus limiting the effectiveness of electrical contact therebetween. These limitations may explain why the electrode currently being commercially offered by the patentee is the embodiment shown in FIGS. 3A and 3B of the '155 and '136 patents, which has a spring and a conductive element secured to the electrode.

SUMMARY OF THE INVENTION

The present invention is for an electrode-supporting assembly for use in contact-start plasma torches to position and provide electrical contact for an electrode while allowing it to be readily replaced. The assembly includes the structure for providing current to the electrode while allowing it limited longitudinal motion, as discussed below.

The term "electrode" as used in the present application defines a consumable element of the torch that can be readily be replaced when the nozzle of the torch is removed.

The plasma torch suitable for incorporating the present invention has a current-carrying cathode that connects to a power supply and terminates in a power transfer surface. The torch has a torch recess for receiving a hollow insulator that slidably engages an electrode and introduces pressurized gas into a chamber defined, in part, by a nozzle element. A retaining element secures the nozzle with respect to the torch recess. The torch is designed to allow the electrode to move between a forward position where it contacts the nozzle element, at which time a current is passed through the electrode to start the torch, and a rear position spaced apart from the nozzle, to which the electrode is blown back by pressure of gas introduced through the insulator, creating the chamber for developing and maintaining plasma. Initially, a pilot arc is maintained from the electrode to the nozzle, developing a pilot plasma arc. When the torch is brought in close proximity to a workpiece to be cut, this non-transferred arc from the electrode to the nozzle element transfers so as to arc from the electrode to the workpiece, thereby establishing a transferred plasma arc. The assembly of the present invention includes an insulator and electrode, as well as related elements to provide more positive electrical contact and improved cooling of the electrode. The related elements allow for simplification of the electrode, allowing it to be easily and inexpensively fabricated.

The insulator is formed of an electrically non-conductive material and is designed to be slidably inserted into the torch recess of the torch in place of the conventional swirl ring, and is retained therein in the conventional manner. Typically, the insulator is forcibly engaged by the nozzle element which, in turn, is secured by the retaining element. The insulator is provided with gas passages to introduce gas into a region of the torch bounded, in part, by the nozzle element, in the same manner as a conventional swirl ring. This gas applies pressure to drive the electrode to its rear position where it is spaced apart from the nozzle, as well as providing gas to sustain plasma, while the remainder of the gas flows backwards along the electrode, providing cooling.

The electrode of the assembly has a longitudinal axis, and a portion of the electrode resides within the insulator when in service. The electrode is movable from the forward position, where it is in contact with the nozzle element of the torch, and the rear position, where the electrode is displaced back from the nozzle element. The forward position serves as a starting position for the torch; when the electrode is so positioned, a current can be passed through the electrode via a resilient element and, as the electrode is withdrawn away from contact with the nozzle element, an arc is generated that initiates the formation of the pilot plasma arc. When the electrode is in this rear position, the pilot arc is maintained between the electrode and the nozzle element with the principal current no longer being provided by the resilient element. When the torch is subsequently brought into close proximity to the workpiece, this non-transferred plasma arc is transferred from the nozzle element to the workpiece.

The electrode has a distal end, which includes an emissive element, and a proximal end. The proximal end of the electrode preferably terminates in a non-planar electrode rear terminal surface. One such electrode rear terminal surface is a frustoconical protrusion or a frustoconical cup.

While the discussion below treats the terminal surface in terms of continuous surfaces, it should be appreciated that the surface need not be strictly continuous, and could be quasi-continuous. In either case, a frustoconical surface having an apex angle between 16° and 60° is practical, and a more restricted range of angles from about 40° to 60° is felt to be particularly effective.

A plunger fabricated from an electrically conductive material also resides within the insulator when in service, positioned rearward of the electrode. The plunger has a front contact surface that is configured so as to releasably mate with the electrode rear terminal surface; these releasable mating surfaces are configured such that they can be brought into mating engagement by translation along a longitudinal axis of the electrode. Thus, when the electrode rear terminal surface is a concave surface, the front contact surface of the plunger is a mating convex surface. Having non-planar mating surfaces such as conical surfaces increases the contact area between the electrode and the plunger to reduce the contact resistance and promote heat transfer, and conical or frustoconical surfaces also provide centering to maintain the electrode and the plunger aligned with each other. The plunger provides a heat sink for extracting heat from the electrode, in part since there is extensive contact between the plunger and the electrode, thereby providing lower operation temperatures for the components during the operation of the torch. The plunger terminates in a rear section terminating in a plunger rear surface.

Having a plunger that carries current to the electrode provides a benefit in that the electrode employed can have a very simple structure and can be readily replaced without requiring additional parts to be replaced, as is required by several embodiments taught in U.S. Pat. Nos. 8,035,055 and 8,115,136, where a resilient spring is employed to supply current during start-up and this spring is trapped on the electrode by a conductive element. Securing the conductive element and spring to the electrode requires these components to be replaced along with the electrode, increasing expense of the electrode, which is a consumable part. A basic embodiment of these patents lacks a spring-loaded conductive element, and thus does not require that the spring be attached to the electrode. However if not attached to the electrode, the spring is either attached to a cathode of the torch, making replacement of the spring difficult when necessary, or a loose element which may be subject to loss when the electrode is removed for replacement.

In other embodiments of the '055 and '136 patents where the conductive element is not incorporated into the electrode, such as those shown in FIGS. 12-15 of these patent in which the electrode is maintained in engagement with the spring by a bayonet coupling, special machining of the proximal end of the electrode is required; this limits the ability to assure good electrical connection therebetween. The bayonet connection may also reduce gas flow past the electrode and thus hamper cooling.

In another embodiment of the above-referenced patents, shown in FIG. 16, posts protruding from the electrode pass through a restricted region of the passage in the insulator. This restriction serves to retain the spring in the insulator; however, it does so by complicating the fabrication of the electrode and reducing the contact area with the spring, which may limit the ability to assure an adequate arc to form a pilot arc.

In some embodiments of the present invention, the plunger not only provides a large surface for contacting the electrode but also is fabricated from silver or a silver alloy, which offers excellent electrical and thermal conductivity and provides an interface between the plunger and the electrode with low thermal and electrical resistance. The use of silver should also reduce the contact resistance between the spring and the plunger, thereby increasing the heat extraction from the spring in the case where the limiting temperature of the spring results from resistive ($I^2R$) heating.

In some embodiments, the plunger is configured to extend beyond the outer diameter of the proximal end of the electrode so as to provide a general flow of cool gases thereacross. This extension further enhances the cooling of the electrode and thus should extend its useful life. Providing the plunger with enlarged surfaces that are configured to deflect the gas flowing backwards enhances the cooling action of the plunger by increasing flow across the surface of the plunger. Cooling of the plunger can be further enhanced when the plunger rear section has a reduced cross section that results in a stepped profile; this step increases turbulence in the gas flow adjacent the plunger rear section and promotes mixing of the gas to increase cooling.

A contact element of an electrically conductive material is provided, which is attached to the insulator and configured to engage it in such a manner that the contact element is forcibly engaged against the power transfer surface of the cathode of the torch when the insulator is secured in place by the retaining element. The contact element in the assembly of the present invention has an array of contact gas passages through which gas flowing back along the electrode can pass, and terminates in a contact forward surface and a contact rear surface. In many embodiments, the contact forward surface is configured to mate against at least a portion of the plunger rear surface of the plunger when the electrode is in its rear position. The contact rear surface is engaged against the power transfer surface when the insulator is retained in position. The contact element can be readily secured in position in the insulator by providing a press-fit.

The resilient element (spring) attaches to the contact element and to the rear section of the plunger. Means for maintaining engagement of the contact element, the plunger, and the spring are provided; this means retains these elements within the insulator when the electrode is replaced, preventing loss. In one embodiment, this means for maintaining contact is provided by frictional engagement between the resilient element, the plunger and the contact element.

In some embodiments, in addition to the frictional contact surfaces to be engaged by the spring, the plunger and contact element can be threaded together by mating the helix of the spring with mating helical grooves on the contact element and plunger.

Providing such positive engagement not only assures maintaining these elements in contact during service so as to assure mechanical connection, but also assures good thermal contact between the spring and the plunger. This thermal contact promotes heat transfer from the spring to the elements to which it is connected to enhance dissipation of the heat resulting from resistive heating ($I^2R$). In cases where the spring is degraded by overheating due to resistive heating, which can result in either corrosion or tempering of the spring, such frictional contact can result in better heat dissipation and, in this way, reduce the potential for overheating of the spring, which might adversely affect its resiliency.

In some embodiments the damage to the spring may result from tempering and/or corrosion of the spring caused by environmental heat to which the spring is exposed. The use of a silver plunger may also serve to reduce the temperature fluctuations of the spring.

In some embodiments, the means for maintaining engagement of the contact element, the plunger, and the spring are provided, at least in part, by the structure of the insulator. In such embodiments, the insulator has a central band of reduced cross-section, providing a passage which is constricted such that the plunger cannot pass therethrough. This constriction provides a bifurcated passage having a passage forward section for receiving the electrode and a passage rear section for constraining the plunger and the spring, although in many embodiments a portion of the plunger protrudes through the constricted band into the passage forward section to engage the electrode. In some embodiments, the central band provides an opening having a cross section sufficiently large as to allow the proximal end of the electrode to enter. However, in all cases the opening must be sufficiently large as to provide a spaced-apart relationship between the electrode and the central band in order to provide open space for air flow. The central band is positioned such that, when the contact element, spring, and plunger are installed in the insulator, the spring (resilient element) is maintained in compression and there is a gap between the plunger and the central band to allow limited gas flow when the electrode is installed in the torch and is in its forward position and in contact with the nozzle of the torch.

Means for maintaining a consistent rear position of the electrode are provided. Consistent positioning of the electrode when the torch is operating in the plasma generating mode helps to accurately position the electrode with respect to the nozzle element to suit the desired operating conditions, as well as to avoid fluctuation in the volume of the plasma chamber. The details of these means for maintaining a consistent rear position of the electrode are a function of the elements that are employed to provide the conductive path from the contact element to the electrode, discussed below.

Means for providing a conductive path between the contact element and the electrode when in the forward position and when in the rear position (these positions being discussed above) can be provided by various structures which will, in part, depend on the electrical connection schemes. In all cases where the resilient element is electrically conductive, at least part of the current passes through the resilient element for both positions of the electrode.

In some embodiments, a conductive stranded element such as a twisted or braided wire or cable (which is at least partially non-resilient) is connected between the contact element and the plunger to pass at least part of the current. In such cases, proper sizing of the resilient element and the conductive stranded element can assure sufficient current to the electrode for operation in both its positions, while allowing sufficient resiliency in the resilient element to assure the smooth transfer between the two limit positions of the electrode when operating the torch. In these cases, the means to maintain a consistent rear position of the electrode can be provided in a variety of ways. In one scheme, the means to maintain a consistent rear position of the electrode is provided by having the resilient element be a compression spring that is sized, relative to the other elements, such that movement of the electrode to its rear position causes the plunger to compress the coils of the resilient element until the coils of the spring are in abutting contact. This stacked configuration of the spring serves as a rigidly non-compressible cylinder for limiting the rearward motion of the electrode. In an alternative embodiment, where the conductive stranded element resides in an envelope defined by the resilient element (the coil), the conductive stranded element folds onto itself and result in a conductive mass residing between the contact element and the plunger.

For many of the embodiments, current to the electrode when in its rear position is provided, at least in part, through a direct path between the contact element and the plunger. In such cases, abutting contact between the contact forward surface of the contact element and the plunger rear surface of the plunger can also provide the means for maintaining a consistent rear position of the electrode. In a similar scheme, the means for maintaining a consistent rear position for the electrode can be provided by abutting contact between an insulator interposed between the plunger rear surface and the contact forward surface. However, in such cases an alternate conduction path such as a stranded conductor as discussed above may be needed to assure sufficient current flow. The use of an insulator may allow the plunger to be smaller in size, reducing the cost when it is fabricated from silver. The insulator is preferably attached to either the contact element or the plunger, such as by a press-fit or a high-temperature adhesive.

BRIEF DESCRIPTION OF THE FIGURES

FIG. 1 illustrates the assembly installed into the torch with an insulator of the assembly secured into a recess in the torch, and the remaining elements of the assembly residing at least partly in the insulator; securing the insulator in position forces a contact element against a current-carrying cathode of the torch. FIG. 1 shows the assembly when an electrode is in a forward position where it contacts a nozzle element of the torch.

FIG. 2 is a partially exploded view of the assembly shown in FIG. 1, showing the individual components when removed from the torch. The electrode has a proximal end having a rear terminal surface formed as a cavity which mates against a plunger having a matching front contact surface, which in turn is engaged by a resilient element that biases the plunger and the electrode forward relative to the contact element that is affixed to the insulator.

FIG. 3 shows the assembly shown in FIGS. 1 and 2 when in service, and when the electrode has been forced by gas pressure to a rear position where it is spaced apart from the nozzle element to generate an arc; the distance between these two positions of the electrode is exaggerated in the figures for purposes of illustration. In this embodiment, current is passed from the contact element to the electrode through the resilient element and the plunger when the electrode is in the forward position shown in FIG. 1, and also passes directly from the contact element through the plunger when the electrode is in the rear position shown in FIG. 3, where surfaces on the contact element and the plunger are in contact. The contact of these surfaces also serves to provide a consistent rear position of the electrode in this embodiment.

FIG. 7 illustrates the embodiment before the electrode is brought into contact with the plunger, where the electrode has not been fully inserted into the insulator. The insulator has a central band which partitions a passage into a forward chamber, in which the electrode can be slidably engaged, and a rear chamber which constrains the resilient element and the plunger. The band has an opening of reduced cross section, which is sized to prevent the plunger from passing therethrough, thereby assuring that the resilient element and the plunger remain engaged at all times; the plunger of this embodiment has a protruding collar to assure that it is retained by the central band. This configuration of the insulator and the plunger also enhances cooling by increasing the flow of cooling gases over the surface of the plunger.

FIG. 8 illustrates the same embodiment as shown in FIG. 7; however, at this position the electrode and the plunger are fully engaged. The reduced cross section of the insulator must be so configured that the plunger cannot pass through it. The size of the reduced cross section region in this embodiment is shaped such the it can accommodate entry of the proximal end of the electrode therethrough as the electrode is blown back by gas pressure. The cross section must also be sufficiently large as to provide a spaced-apart relationship between the electrode and the opening so that, in service, gas flows around the electrode when the electrode is in its rear position. In this embodiment, a portion of the plunger can extend forward of the central band to aid in the alignment of the electrode with the plunger when the electrode is replaced.

FIG. 9 illustrates the same embodiment as shown in FIGS. 7 and 8 when the electrode has, in part, passed through the reduced cross section central band of the insulator and the rear surface of the plunger has engaged the contact element.

DETAILED DESCRIPTION OF THE PREFERRED EMBODIMENTS

Figure 1:
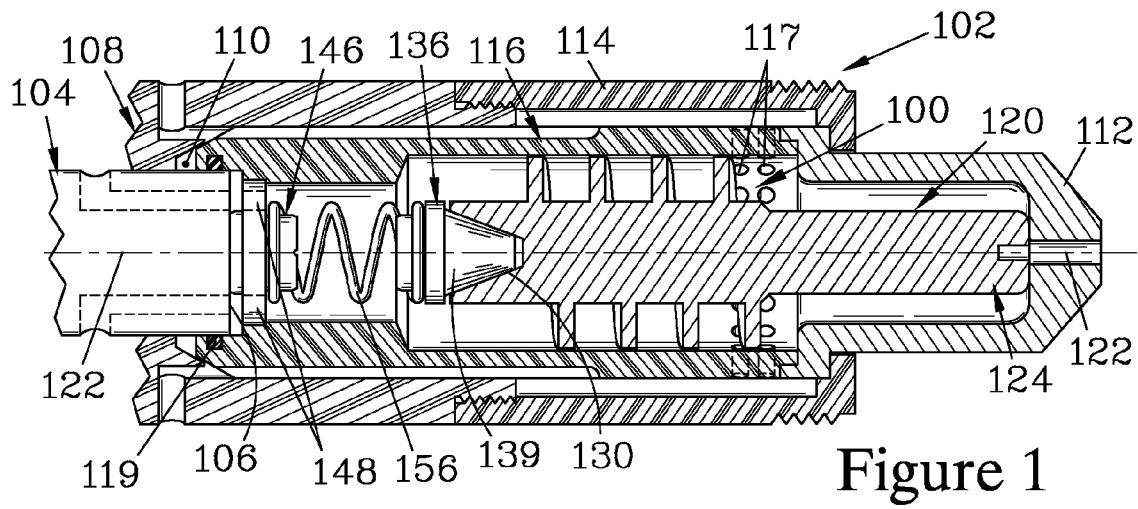
FIGS. 1-3 are section views illustrating an electrode-supporting assembly for a contact-start plasma arc torch, the assembly forming one embodiment of the present invention.
Figure 2:
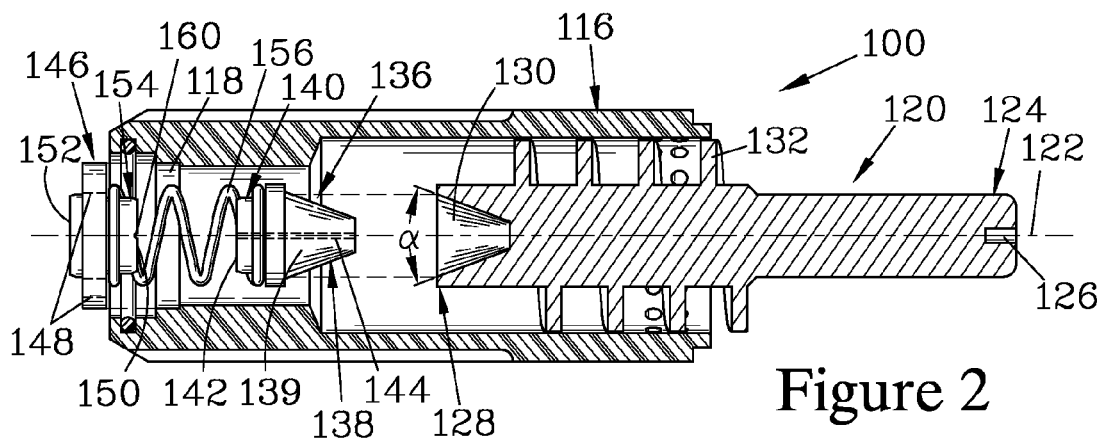
Figure 3:
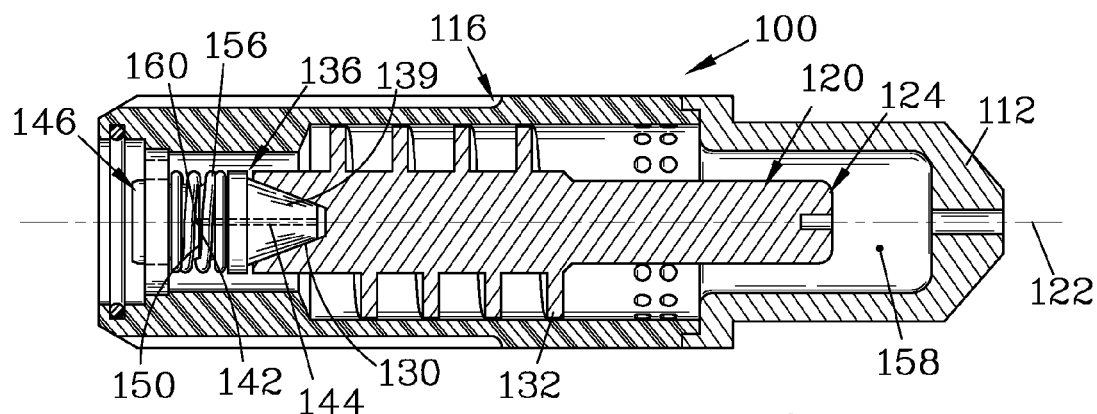

FIGS. 1 through 3 are section views illustrating an electrode-supporting assembly 100 for use in a contact start plasma arc torch 102 (only partially shown). The torch 102 can be similar to those torches taught in U.S. Pat. Nos. 8,035,055 and 8,115,136 with the electrode-supporting assembly 100 replacing the conventional structure for supporting and providing electrical current to an electrode. The torch 102 has a current-carrying cathode 104 (shown in FIG. 1) that connects to a power supply (not shown) and has a power transfer surface 106 for contacting a conventional electrode. The cathode 104 is mounted in a torch body element 108 that is configured with a torch recess 110 for receiving a conventional insulated swirl ring element. A nozzle element 112 can be secured onto the insulator and the torch body element 108 by a retaining element 114 that threadably engages the torch body element 108.

The assembly 100 has an insulator 116 that is configured to be slidably installed onto the cathode 104 so as to reside in the torch recess 110 in place of the swirl ring/insulator that is conventionally employed. The insulator 116 is retained in place by engagement with the nozzle element 112 when the retaining element 114 is tightened onto the torch body element 108. The insulator 116 has an array of swirl gas passages 117, configured as a conventional insulated swirl ring element, but differs from a conventional swirl ring element in having a contact element recess 118 (best shown in FIG. 2), discussed below. The insulator 116 can be retained in the torch recess 110 by forcible engagement of an O-ring 119, which is mounted in the insulator 116, with the cathode 104.

The insulator 116 serves as part of the structure for positioning and supplying electrical power to an electrode 120 having a longitudinal axis 122, formed of a conductive material such as copper. The electrode 120 is movable with respect to the insulator 116 between a forward position (shown in FIG. 1) and a rear position (shown in FIG. 3). The electrode 120 terminates at a distal end 124 (labeled in FIG. 2) having an emissive element 126 embedded therein, and a proximal end 128 that terminates at a non-planar electrode rear terminal surface 130. In this embodiment, the electrode 120 has a spiral fin 132 that aids in extracting heat to cool the electrode 120. This electrode is a free standing element and unencumbered by attachment to other elements, so that it can be readily removed once the retaining element 114 and the nozzle element 112 are removed from the torch body element 108. The removal of the electrode 120 can be done while leaving the rest of the structure of the assembly 100 intact.

The electrode rear terminal surface 130 of the electrode 120 is a concave surface, forming a cavity. In this embodiment, the electrode rear terminal surface 130 is symmetrically disposed about the longitudinal axis 122 and terminates at the proximal end 128. The electrode rear terminal surface 130 increases in cross section as it approaches the proximal end 128 of the electrode. In the assembly 100, the electrode rear terminal surface 130 is frustoconical, providing a continuous surface. The cone section defining the electrode rear terminal surface 130 can be formed by rotation about the longitudinal axis 122 of a line segment inclined with respect to the axis 122 so as to define a cone having an apex angle α measuring between about 16° and 60°, and more preferably between about 40° and 60°. An apex angle of about 50° is felt to provide a desirable area of contact while maintaining the angle α sufficiently large as to reduce the tolerances required to provide accurate longitudinal positioning of an element mated against the electrode rear terminal surface 130, as discussed below.

The electrode-supporting assembly 100 also has a plunger 136, which is again fabricated from a highly conductive material. The plunger 136 for this embodiment can be fabricated from silver or silver-based alloy, resulting in high thermal and electrical conduction across the interfaces between the plunger 136 and adjacent elements. The plunger 136 has a plunger front section 138 (again, labeled in FIG. 2) having a non-planar plunger front contact surface 139, and a plunger rear section 140 (best shown in FIG. 2) that terminates in a plunger rear surface 142. The plunger front contact surface 139 is configured to mateably engage the electrode rear terminal surface 130, and thus is convex and frustoconical in this embodiment. While frustoconical surfaces (130, 139) are shown, it should be appreciated that other surface shapes could be employed. These non-planar mating surfaces should enhance thermal and electrical conduction compared to the use of planar surfaces due to the increased contacting surface area. To allow the electrode 120 to be brought into mated engagement with the plunger 136, the mating surfaces should be configured so as to avoid any obstructions that would prevent them from being brought into engagement by translation along the longitudinal axis 122. For frustoconical surfaces (130, 139), defining the cone to have an apex angle α of at least about 16° will prevent binding, allowing the surfaces (130, 139) to provide non-planar releasably mateable surfaces that can be readily released from engagement when the electrode 120 is replaced.

In cases where trapped air is likely to be a concern, a plunger passage 144 such as a drilled hole can be provided, which passes from the plunger front section 138 through the plunger rear surface 142, to allow escape of air trapped between the plunger front contact surface 139 and the electrode rear terminal surface 130. Alternative structures to provide a path for escape of trapped air, such as one or more grooves in one or both of the mating surfaces (130, 139) could be employed.

A contact element 146 formed of an electrically conductive material attaches to the insulator 116 so as to reside in the contact element recess 118; preferably, the contact element 146 is press-fitted into the insulator 116.

The contact element 146 has an array of gas passages 148 therethrough, and has a contact forward surface 150 and a contact rear surface 152. The contact element 146 is configured such that, when the insulator 116 is secured in the torch recess 110 by the nozzle element 112 and the retaining element 114, the contact rear surface 152 is forcibly engaged against the power transfer surface 106 of the cathode 104. This forcible engagement provides a more positive contact with the cathode 104 than in many of the embodiments taught in the '055 and '136 patents, which rely on spring pressure to provide such contact. The contact forward surface 150 is provided on a contact forward section 154 of the contact element 146.

A resilient element 156 connects between the plunger 136 and the contact element 146, and in this embodiment the resilient element 156 is a coiled compression spring. The resilient element 156 engages the plunger rear section 140 and the contact forward section 154, serving to bias the plunger 136 into contact with the electrode rear terminal surface 130 when the electrode 120 resides in the torch 102 and is constrained therein by the nozzle element 112, thereby biasing the electrode 120 to its forward position shown in FIG. 1. In this position, contact of the electrode 120 with the nozzle element 112 allows current passed through the electrode 120 to the nozzle element 112 to complete a circuit. Gas is subsequently introduced through the insulator 116 and pressurizes the region bounded by the nozzle element 112 and the distal end 124 of the electrode 120; this pressure forces the electrode 120 back against the bias of the resilient element 156 to its rear position, shown in FIG. 3 (the distance traversed by the electrode 120 is exaggerated in the figures for purposes of illustration). As the electrode 120 is moved away from the nozzle element 112, the current results in an arc forming therebetween, this arc heating the gas in the bounded region to generate a plasma, the bounded region surrounding the distal end 124 serving as a plasma chamber 158. The rearward movement of the electrode 120 moves the plunger 136, which is engaged with the electrode 120, forcing the plunger 136 to move towards the contact element 146, compressing the resilient element 156. Means for maintaining engagement of the plunger 136, the resilient element 156, and the contact element 146 with each other are provided in this embodiment by configuring the plunger rear section 140 and the contact forward section 154 such that they are frictionally engaged by the resilient element 156. That is the resilient element 156 is frictionally engaged with both the plunger 136 and the contact element 146. The frictional force is sufficient that the plunger 136 remains in place within the insulator 116 and thus within the torch recess 110 when the torch 102 is opened and the electrode 120 is removed.

In a similar embodiment to that shown in FIGS. 1-3, the plunger and the contact elements have threads configured to threadably engage the resilient element with the plunger and the contact element.

To stabilize the volume of the plasma chamber 158 when the torch 102 is operating in either a non-transferred arc or transferred arc mode, means for providing a consistent rear position of the electrode 120 are provided. In this embodiment, the plunger 136 and the contact element 146 are configured such that the plunger rear surface 142 of the plunger 136 engages the contact forward surface 150 of the contact element 146 when the electrode 120 is moved backwards to the rear position. It should be noted that this position is maintained not only during the transferred arc mode of operation, but is needed to maintain a stable non-transferred arc mode.

The contact element 146 is provided with a vent groove 160 across the contact forward surface 150, positioned to communicate with the plunger passage 144 to provide a path for escape of heated air when the plunger 136 and the contact element 146 are in abutting contact. It should be appreciated that such a vent groove could alternatively be provided on the plunger 136.

Means for providing a conductive path between the contact element 146 and the electrode 120 when in the forward position and when in the rear position are provided to carry electrical current from the power supply of the torch 102 to the electrode 120. In the electrode-supporting assembly 100, the means for providing a conductive path include the resilient element 156, which conducts all the current to the electrode 120 when the electrode 120 is in the forward position shown in FIG. 1 (where there is contact between the electrode 120 and the nozzle element 112), and includes the engagement of the plunger rear surface 142 and the contact forward surface 150 when the electrode 120 is in its rear position. It should be noted that this rear position is the dominant position for the electrode, and is even the position for the stabilized pilot arc mode. In both positions, the current is conducted from the plunger 136 to the electrode 120 via the contact between the plunger front contact surface 139 of the plunger 136 and the electrode rear terminal surface 130 of the electrode 120. Thus, in the pilot or transferred arc mode of operation where the electrode 120 is in its rear position, the engagement of the plunger 136 and the contact element 146 provides both stabilization of the rear position of the electrode 120 and a conductive path from the contact element 146 to the plunger 136, which in turn conducts current to the electrode 120. Due to the relatively large contact surfaces (142, 150), the current passed to the electrode 120 in the rear position through the latter path is considerably greater than the current supplied via the resilient element 156, and the reduced current as well as heat transfer to the plunger 136 and the contact element 146 protects the resilient element 156 from overheating that might otherwise damage its resilient character.

In addition to the tempering problems degrading the resiliency of the spring 156 by resistive heating of the spring, the spring 156 is subject to heating through conduction of heat from the electrode 120 through the plunger 136 to the spring 156. Further heating may be caused by the gas passing over the spring 156 may be sufficiently hot to result in similar deterioration of performance with use. Also, the gas passing over the spring 156 may degrade the spring 156 by corrosion if the gas is sufficiently heated.

Figure 4:
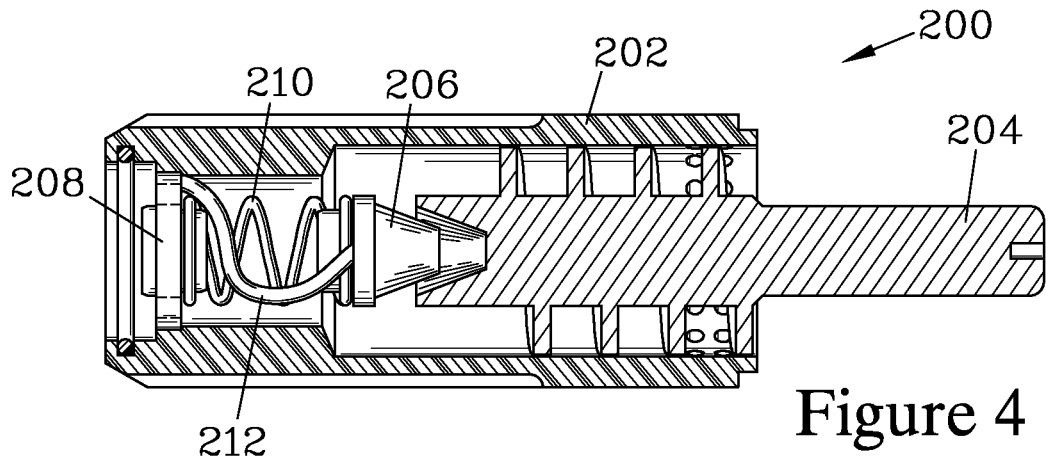
FIG. 4 is a section view of an embodiment that is similar to that shown in FIG. 1, with the exception that the assembly has a stranded conductor to carry electrical current between the contact element and the plunger to provide greater capacity to carry current to the electrode. In this embodiment, the plunger and the contact element abut when the electrode is in its rear position to assure a consistent rear position of the electrode.

FIG. 4 is a section view of an electrode-supporting assembly 200 that is similar to the electrode-supporting assembly 100 shown in FIG. 1, having a insulator 202, an electrode 204, a plunger 206, a contact element 208, and a resilient element 210. In this embodiment, a supplemental conductor 212 is provided that connects directly between the contact element 208 and the plunger 206. The supplemental conductor 212 is preferably a stranded cable to provide a high degree of flexibility. The supplemental conductor 212 can provide the means for providing a conductive path between the contact element 208 and the electrode 204 via the plunger 206 when the electrode 204 is in the forward position and in the rear position, either alone or in combination with the resilient element 210.

Since the supplemental conductor 212, either alone or in combination with the resilient element 210, can carry all the current from the contact element 208 to the plunger 206 when operating in either mode, the plunger 206 and the contact element 208 need not be configured to engage when the electrode 204 is in the rear position. However, the contact scheme illustrated the embodiment shown in FIG. 4 does not in and of itself assure that the electrode 204 is stabilized when a torch in which the assembly 200 is employed is operating in plasma-generating mode. Alternate structure for providing means for providing a consistent rear position of the electrode may be needed. One such means could be provided by configuring the resilient element 210 such that its coils are completely collapsed and contact each other when the resilient element 210 is compressed as the electrode 204 moves to its rear position. Such a scheme may be more practical when the resilient element is formed by machining away a tubular element, in which case the resilient element may be formed integrally with the contact element. However, the requirement of the resilient element 210 may increase its cost of fabrication and may provide only limited stability.

Figure 5:
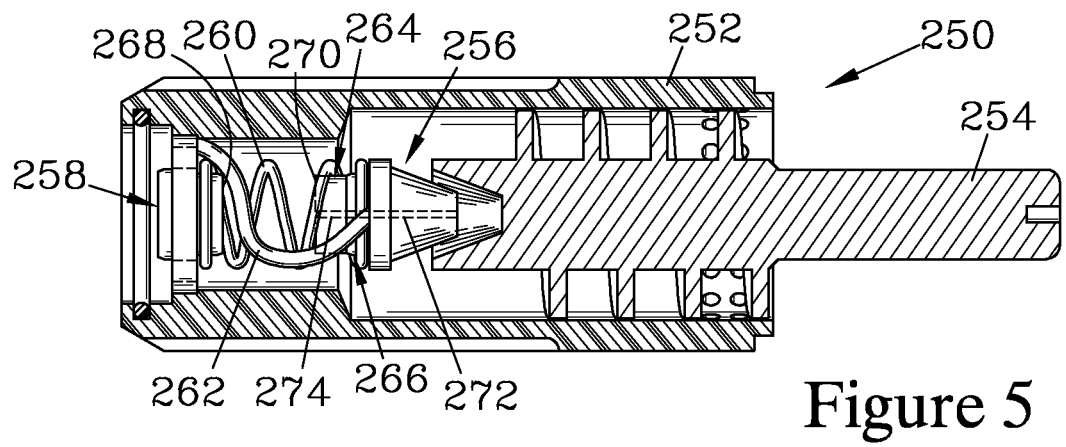
FIG. 5 is a section view of another embodiment that employs the conductor configuration shown in FIG. 4, but differs in that it employs an insulating element interposed between the plunger and the contact element to define the rear position of the electrode and thus the length of the plasma chamber.

FIG. 5 is a section view of another embodiment of the present invention, an electrode-supporting assembly 250, which again has a insulator 252, an electrode 254, a plunger 256, a contact element 258, a resilient element 260, and a supplemental conductor 262. However, the assembly 250 differs from the electrode-supporting assembly 200 in the structure that is employed to provide means for providing a consistent rear position of the electrode 254. In the electrode-supporting assembly 250, an insulator 264 is interposed between the plunger 256 and the contact element 258. The insulator 264 is attached to either a rear section 266 of the plunger 256, as shown in FIG. 5 and discussed below, or to a contact forward surface 268 of the contact element 258. The insulator 264 can be formed of a suitably rigid, non-conductive material such as Vespel® plastic, and can be attached to the plunger 256 by a friction fit or a high-temperature adhesive such as Loctite® Super Glue ULTRA Gel Control. Alternatively, a non-conductive material can be deposited onto a rear surface of the rear section 266 of the plunger 256 to form the insulator 264. Similar techniques can be employed when the insulator 264 is to be attached to the contact element 258 rather than to the plunger 256.

The insulator 264 has a rearward-facing insulator bearing surface 270. When the electrode 254 is moved from its forward position to its rear position, the insulator bearing surface 270 is brought into engagement with the contact forward surface 268, and the engagement of these surfaces (268, 270) provides stabilization of the plunger 256 and the electrode 254 in a manner similar to that of the surfaces (142, 150) of the electrode-supporting assembly 100 discussed above.

The attachment of the insulator 264 to the plunger 256 may block a plunger passage 272 extending through the plunger 256. To extend the plunger passage 272, the insulator 264 is provided with an insulator passage 274.

While the embodiment shown in FIG. 5 employs an insulator interposed between the plunger and the contact element to limit rearward position of the electrode, it should be appreciated that alternate structures for physically limiting the rearward motion of the electrode without requiring direct contact between the plunger and the contact element could be employed, particularly when a supplemental conductor is provided. For example, the insulator could be provided with projections that are configured to be engaged by the electrode and/or the plunger to block further rearward motion once the electrode has reached its specified rear position.

Figure 6:
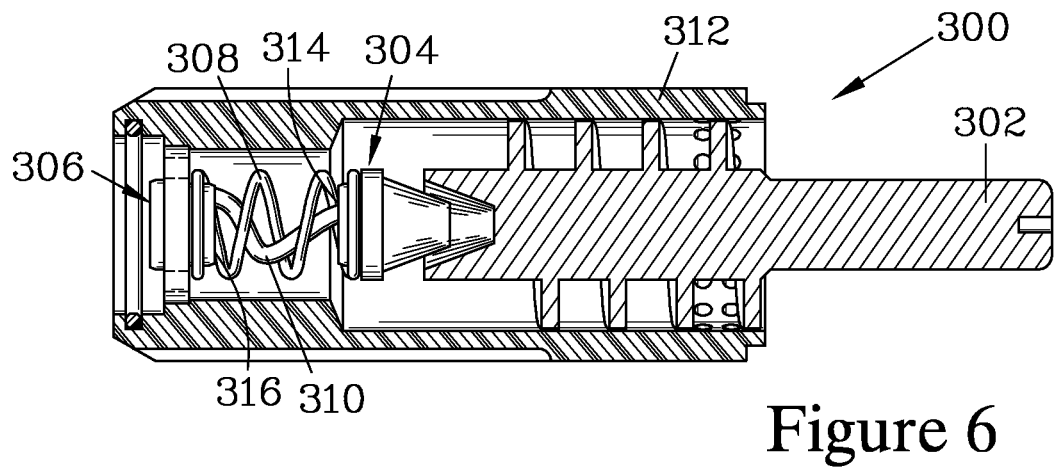
FIG. 6 is a section view of another embodiment similar to that of FIG. 4; however, in this embodiment, the stranded conductor resides within an envelope defined by the coils of the resilient element.

FIG. 6 is a section view of an electrode-supporting assembly 300 which is again similar to the electrode-supporting assembly 200 shown in FIG. 4, but again differing in the means for providing a consistent rear position of an electrode 302. Again, a plunger 304 and a contact element 306 engage a resilient element 308 and are also connected together by a supplemental conductor 310, these elements all residing within a insulator 312. In the electrode-supporting assembly 300, the supplemental conductor 310 resides within a cylindrical envelope defined by the resilient element 308.

Figure 7:
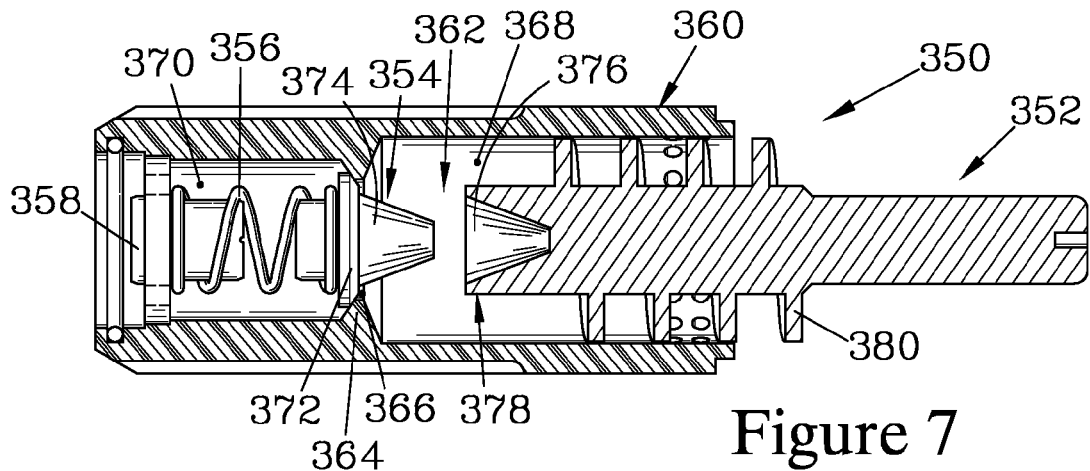
FIGS. 7-9 are section views illustrating another embodiment, which has many features in common with the embodiment shown in FIGS. 1-3, but which eliminates the need for a frictional fit to maintain the elements within the insulator when the electrode is removed.
Figure 8:
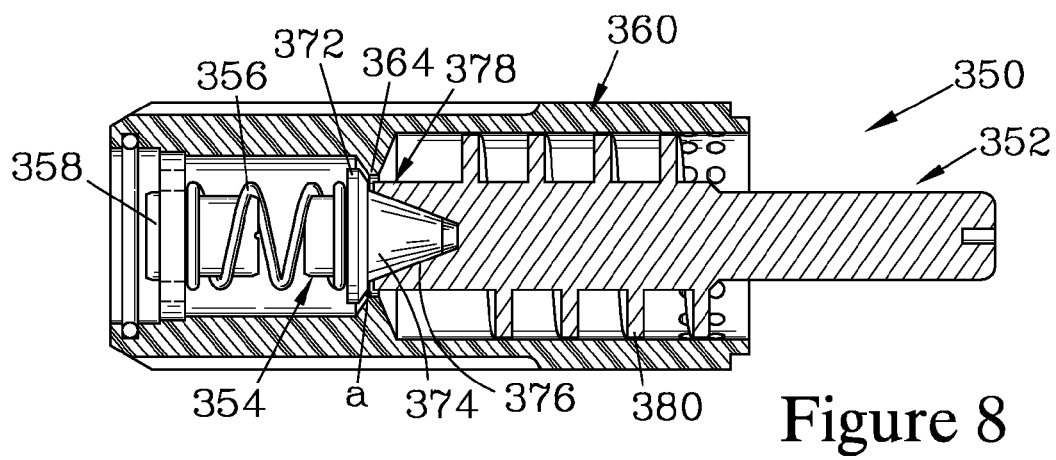
Figure 9:
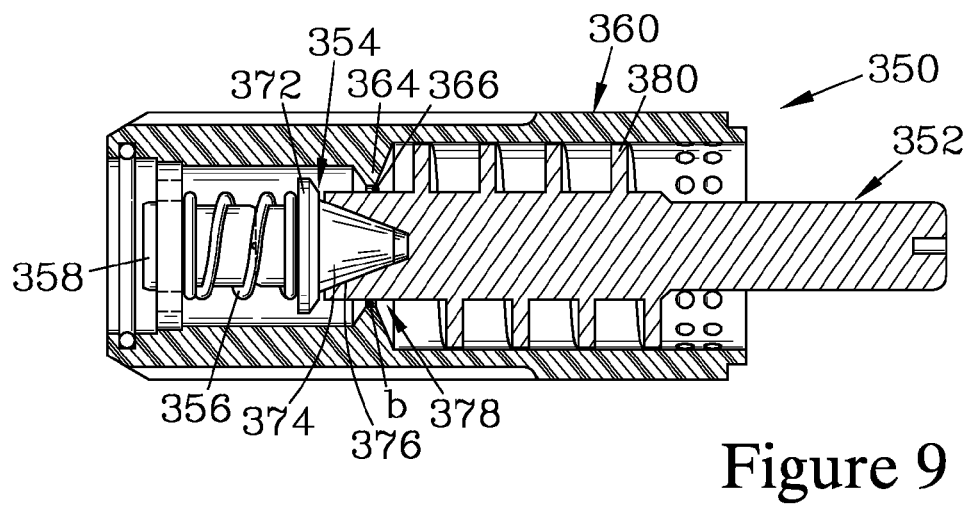

FIGS. 7-9 are section views illustrating an electrode-supporting assembly 350, which forms another embodiment of the present invention, having many features in common with the electrode-supporting assembly 100 shown in FIGS. 1-3. The electrode-supporting assembly 350 again has an electrode 352 engaged by a plunger 354 which in turn is engaged by a resilient element 356, which in the case is a conductive spring. With the assistance of the resilient element 356, the plunger serves to bias the electrode 352 forward as well as provide an electrical current path to the electrode 352. This embodiment eliminates the need for a frictional fit of the plunger 354 with a resilient element 356, as well as a frictional fit between the resilient element 356 and a contact element 358 to maintain the plunger 354 and the resilient element 356 in place in an insulator 360 when the electrode 352 is removed. While a binding fit is not required to retain the plunger 354, it may still be desirable to assure electrical contact between these elements. In this embodiment, the insulator 360 incorporates a swirl ring and has a passage 362 therethrough, which traverses the length of the insulator 360.

FIG. 7 illustrates the electrode-supporting assembly 350 when the electrode 352 is removed from contact with the plunger 354. The passage 362 through the insulator 360 is provided with a band 364 having a reduced cross section that forms a band opening 366, which partitions the passage 362 into a forward chamber 368 and a rear chamber 370. The forward chamber 368 has a cross section such that the electrode 352 can be slidably engaged therein. The plunger 354 in turn is provided with a collar 372 that is sized larger than the band opening 366; this sizing arrangement assures that the movement of the plunger 354 is restrained such that the collar 372 and resilient element 356 are confined to the rear chamber 370. Thus, the resilient element 356 biases the plunger 354 so as to forcibly engage the collar 372 against the band 364, as shown in FIG. 7.

The collar 372 is positioned rearward of a front contact surface 374 of the plunger 354, which is configured to mateably engage an electrode rear terminal surface 376 in a proximal end 378 of the electrode 352 when the electrode 352 is installed so as to reside partially within the insulator 360, as shown in FIGS. 8 and 9. While the collar 372 is prevented from passing through the opening 366 of the band 364, the front contact surface 374 must extend forward sufficiently to allow the plunger 354 to bias the electrode 352 against a nozzle (not shown) of the torch into which the assembly 350 is installed. The insulator 360 and the plunger 354 should be configured such that, when the electrode is installed in a torch and a nozzle is in place, a gap (a) is provided between the band 364 and the plunger 354, as illustrated in FIG. 8. This gap (a) should be made sufficient in size to avoid restricting the backward flow of cooling gas that passes a spiral fin 380 of the electrode 352.

The proximal end 378 of the electrode 352 in this embodiment is sized such that, when the electrode 352 is blown back to its rear position where the proximal end 378 passes into or at least partly through the band opening 366, the electrode 352 and the band 364 remain in a spaced apart relationship to leave a gap (b) therebetween as shown in FIG. 9. This gap (b) is made sufficient to maintain free flow of gas between the band 364 and the electrode 352 when the electrode 352 has moved to its rear position. In this embodiment, a portion of the front contact surface 374 of the plunger 354 extends through the band 364 when the collar 372 engages the reduced cross section band 364, this forward-extending portion of the front contact surface 374 serving to aid in bringing the plunger 354 into axial alignment with the electrode 352 so that the front contact surface 374 of the plunger 354 becomes properly engaged with the electrode rear terminal surface 376 when the electrode 352 is installed.

As with the assembly 100 shown in FIGS. 1-3, the plunger 354, the resilient element 356, and the contact element 358 are designed to allow the plunger 354 to be forced by the electrode 352 (which is being driven rearward by the gas pressure being introduced through the swirl ring) against the bias of the resilient element 356 until the plunger 354 engages the contact element 358, as shown in FIG. 9. The engagement of the plunger 354 and the contact element 358 defines the rear position of the electrode 352, and this engagement again provides both means for providing a consistent rear position of the electrode 352 and means for providing a conductive path between the contact element 358 and the electrode 352 when in the rear position. Means for providing a conductive path when the electrode 352 is in the forward position are provided by the resilient element 356, but could include a supplemental conductor such as those discussed above.

An additional benefit of the collar 372 of the plunger 354 is that it should act to deflect the rearward flow of cooling gas that has passed through the gap (b) between the electrode 352 and the band 364. This deflection should increase the flow of cool gas across the surfaces of the plunger 354, thereby enhancing its ability to act as a heat sink to aid in cooling the electrode 352, with which the plunger 354 is in thermal contact. The collar 372 may further enhance cooling by providing a shoulder over which the gas flows, thereby increasing the turbulence of the flow over the rear portion of the plunger 354 to promote mixing of the gas as it flows past the plunger 354.

Figure 10:
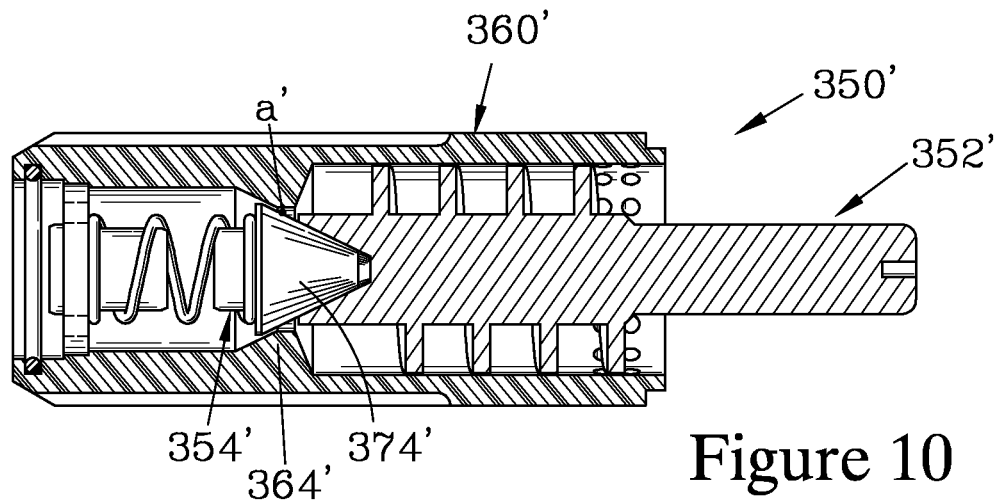
FIGS. 10 and 11 illustrate an embodiment similar to that of FIGS. 7-9, but where the forward surface of the plunger is extended so as to engage a reduced cross-section region of the insulator without requiring a collar, as employed in the earlier embodiment. This extended surface may provide less obstruction to gas flow through the reduced cross-section region past the plunger.
Figure 11:
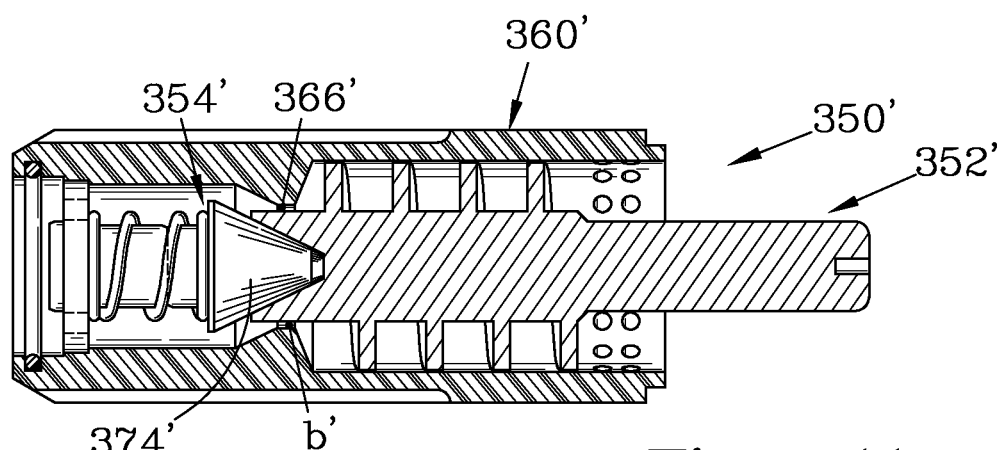

FIGS. 10 and 11 illustrate an electrode-supporting assembly 350' that is similar to the electrode-supporting assembly 350 shown in FIGS. 7-9, but where the plunger 354' lacks a collar 372. In this embodiment, the front contact surface 374' of the plunger 354' is extended, and the opening 366' of the reduced cross-section band 364' of the insulator 360' is configured to be engaged by the front contact surface 374' to limit forward motion of the plunger 354', while allowing a portion of the front contact surface 374' to pass through the opening 366' of the reduced-cross section band 364' for engagement by the electrode 352'. When the electrode 352' is engaged with the plunger 354' and the nozzle of the torch (not illustrated) is in place such that the nozzle engages the electrode 352', the gap (a') exists between the plunger 354' and the band 364' so as to allow gas to flow therethrough. The electrode 352' has also been sized such that, when it is blown back to its rear position where it passes into the opening 366', the resulting gap (b') is sufficient for gas to flow therethrough.

Figure 12:
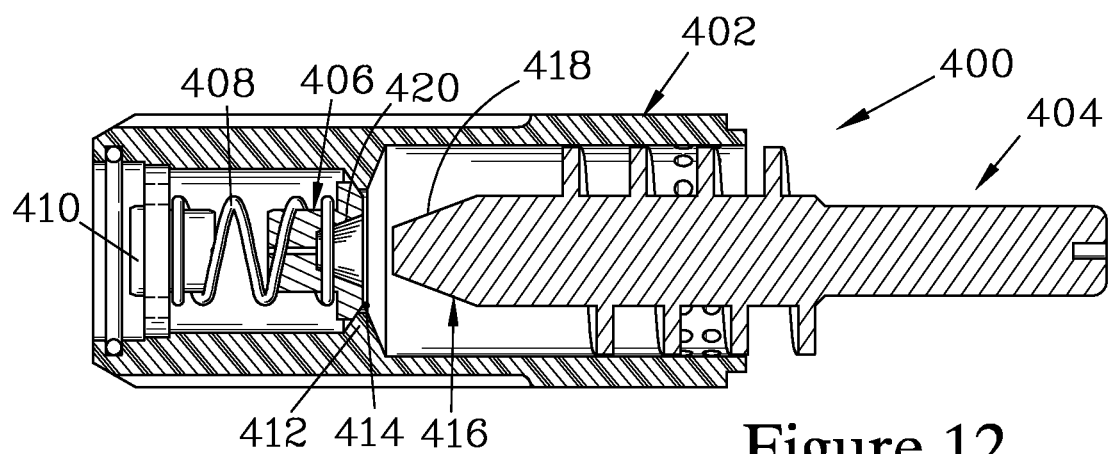
FIG. 12 is a section view that illustrates an embodiment similar to that shown in FIGS. 7-9, but where the electrode has a non-planar electrode rear terminal surface that is a convex frustoconical surface, and the plunger has a non-planar front contact surface that is formed as a matching concave frustoconical cup.

FIG. 12 illustrates an electrode-supporting assembly 400 that shares many features in common with the electrode-supporting assembly 350 discussed above. Again, the assembly has a insulator 402, an electrode 404, a plunger 406, a resilient element 408, and a contact element 410, and the insulator 402 is formed with a band 412 to provide an opening 414 having a reduced cross section.

In the assembly 400, the electrode 404 has a proximal end 416 that is tapered to form a convex frusto-conical electrode rear terminal surface 418. The plunger 406 has a plunger front contact surface 420 that is formed as a frustoconical cavity, shaped to mateably receive the electrode rear terminal surface 418. The electrode 404 is configured relative to the band 412 so as to be insertable into engagement with the plunger front contact surface 420.

Figure 13:
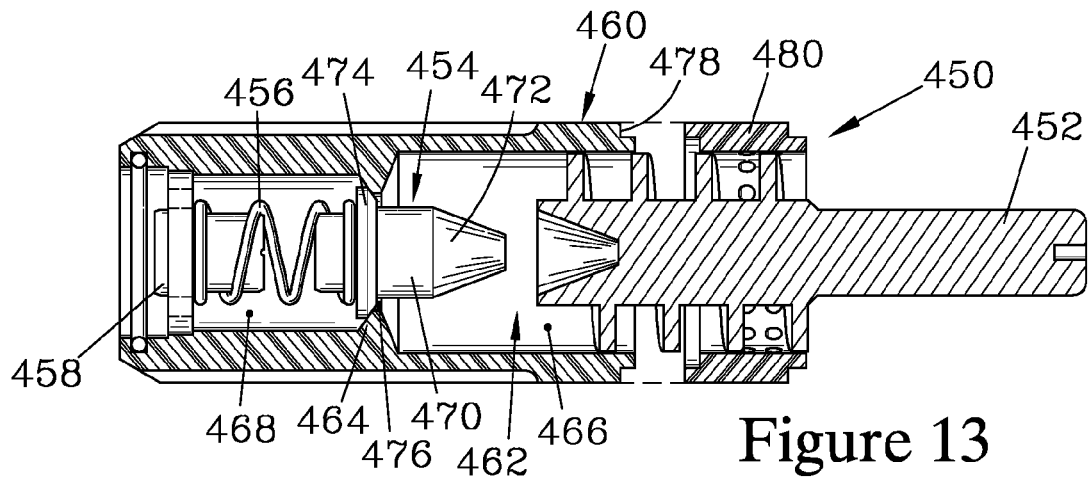
FIGS. 13 through 15 illustrate an embodiment similar to that shown in FIGS. 7-9, but where the plunger is configured such that it engages the contact element so as to limit rearward travel of the electrode before the proximal end of the electrode reaches the opening between the passage forward section and the passage rear section. This embodiment also illustrates a swirl ring that is formed as a separate piece, rather than as an integral part of the insulator.
Figure 14:
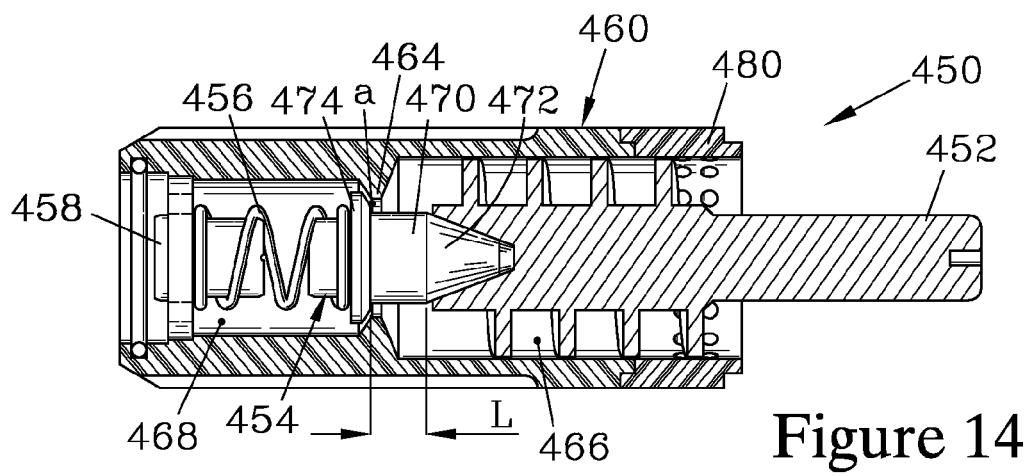
Figure 15:
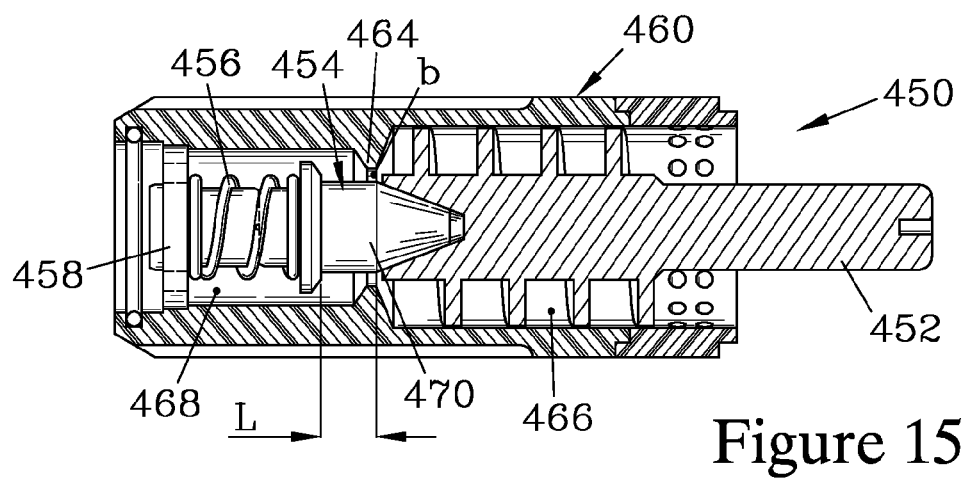

FIGS. 13-15 illustrate an electrode-supporting assembly 450 that forms another embodiment of the present invention, and which has many features in common with the electrode-supporting assembly 350 shown in FIGS. 7-9. The assembly 450 again has an electrode 452 that engages a plunger 454 which in turn engages a resilient element 456 that connects to a power contact element 458, these elements (454, 456, 458) serving to provide electrical power to the electrode 452 when biased to the electrode's forward position by the resilient element 456. The electrode 452 mates with the plunger 454 as is the situation with the earlier embodiments. An insulator 460 is provided, having a passage 462 therethrough. The passage 462 has a band 464 which partitions the passage 462 into a forward chamber 466 and a rear chamber 468. Again, the plunger 454 and the resilient element 456 are trapped in the rear chamber 468.

This embodiment differs from the earlier electrode-supporting assembly 350 in that the plunger 454 has a cylindrical extension 470 positioned between a frustoconical plunger front contact surface 472 and a collar 474. This cylindrical extension 470 has a length L (labeled in FIGS. 14 and 15) that is chosen to be sufficiently long as to prevent the electrode 452 from entering an opening 476 (labeled in FIG. 13) defined by the band 464. This length L assures that a gap (a) remains free when the torch is operating, as illustrated in FIG. 14. The extension 470 must also have the length L sufficient that a gap (b) is present when the electrode 452 is in its rear position, as shown in FIG. 15. These conditions assure flow of gas past the plunger 454 when gas is introduced into the passage 462.

The insulator 460 of this embodiment does not include an integral swirl ring, but rather has an insulator stepped forward edge 478 that stabilizes a separate swirl ring 480, as best shown in FIG. 13.

Figure 16:
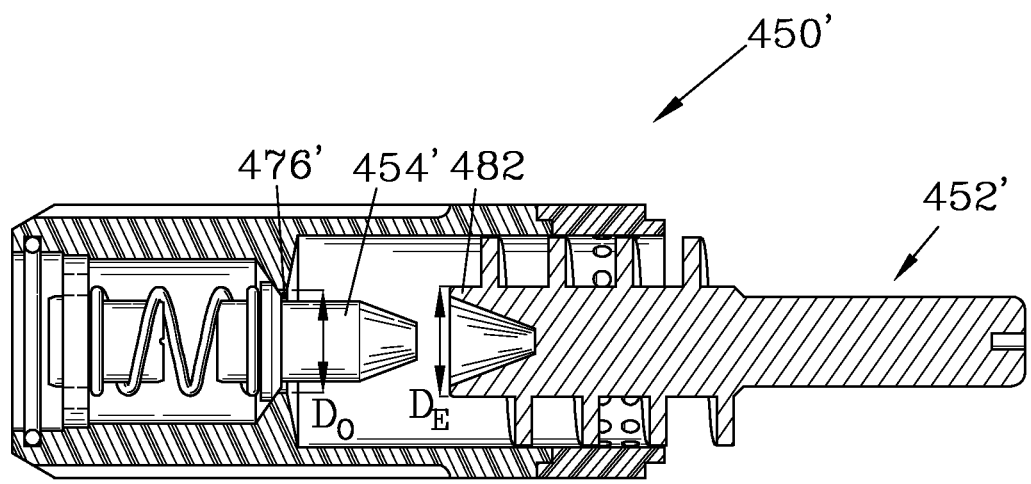
FIGS. 16 and 17 illustrate an embodiment that is similar to that shown in FIGS. 13-15, but where the electrode geometry is such that the electrode proximal end has a cross section greater than that of the opening and thus would prevent it from passing into the opening between the passage forward section and the passage rear section independent of its engagement with the plunger.
Figure 17:
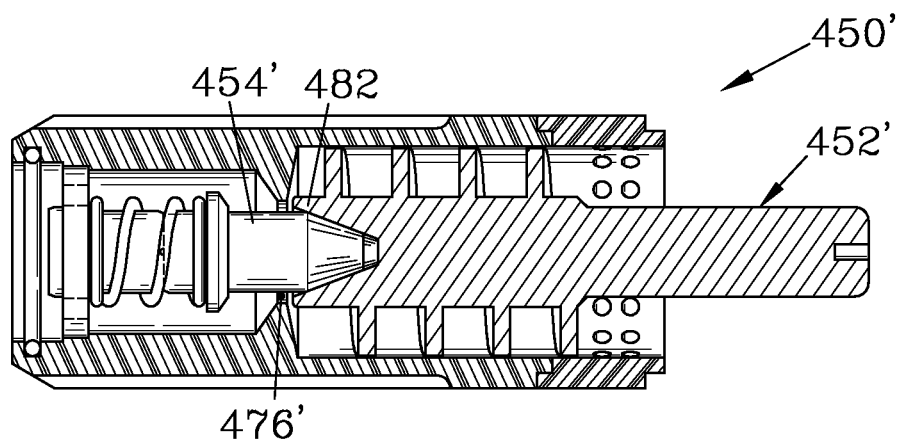

FIGS. 16 and 17 illustrate an electrode-supporting assembly 450' which has all the limitations of the electrode-supporting assembly 450 illustrated in FIG. 13-15, but differs from the earlier embodiment in that the electrode 452' has a proximal end region 482 having an electrode diameter $D_E$ which is greater than an opening diameter $D_O$ of the opening 476'; this geometry should increase the turbulence of the flow of the air over the plunger 454' and thus should enhance the heat transfer between the air flow and the plunger 454'.

While the novel features of the present invention have been described in terms of particular embodiments and preferred applications, it should be appreciated by one skilled in the art that substitution of materials and modification of details can be made without departing from the spirit of the invention.

What I claim is:

1. An electrode and electrode-supporting assembly for use in a contact start plasma arc torch having,
   a current-carrying cathode terminating in a power transfer surface,
   a torch recess,
   a nozzle element, and
   a retaining element for securing the nozzle element with respect to the torch recess,
   the electrode and electrode-supporting assembly comprising:
      an insulator slidably engagable into the torch recess and configured to be retained therein by the retaining element when securing the nozzle element;
      an electrode having a longitudinal axis and residing at least partially in said insulator, said electrode being axially movable between a forward position for contacting the nozzle element to start the torch and a rear position spaced apart from the nozzle element so as to maintain a plasma arc, said electrode terminating in,
         a distal end including an emissive element,
         a proximal end terminating at an electrode rear terminal surface;
      a plunger fabricated from a conductive material and residing in said insulator, said plunger having,
         a plunger front contact surface configured so as to be releasably axially mateable with said electrode rear terminal surface of said electrode, and
         a plunger rear section terminating in a plunger rear surface;
      a contact element configured to engage said insulator and having,
         an array of gas passages therethrough to allow gas flow through said contact element,
         a contact forward surface, and
         a contact rear surface, said contact element engaging said insulator such that said contact rear surface is forcibly engaged against the power transfer surface of the cathode when said insulator is retained in the torch recess;
      a resilient element engaging said contact element and said plunger rear section so as to bias said plunger into engagement with said electrode, thereby biasing said electrode to its forward position,
         the engagement of said resilient element with said plunger being such that said plunger is interposed between said resilient element and said electrode;
      means for maintaining engagement of said plunger, said resilient element, and said contact element with each other,
         thereby assuring said plunger and said resilient element are retained in said insulator;
      means for providing a consistent rear position of said electrode; and
      means for providing a conductive path between said contact element and said electrode via said plunger when said electrode is in the forward position; and
      means for providing a conductive path between said contact element and said electrode via said plunger when said electrode is in the rear position.

2. The assembly of claim 1 wherein said electrode rear terminal surface and said plunger front contact surface are mateable non-planar surfaces.

3. The assembly of claim 2 wherein said electrode rear terminal surface and said plunger front contact surface are substantially frustoconical surfaces.

4. The assembly of claim 3 wherein said means for maintaining engagement of said plunger, said resilient element, and said contact element is provided by a frictional engagement of said resilient element with said contact element and with said rear section of said plunger.

5. The assembly of claim 2 wherein said means for maintaining engagement of said plunger, said resilient element, and said contact element further comprises:
   a central band of said insulator having a cross section sized to form an opening sized such that said plunger cannot pass therethrough, said central band defining a forward chamber, in which at least a portion of said electrode resides, and a rear chamber, in which said contact element, said resilient element, and at least a portion of said plunger reside, said central band being positioned such that said resilient element is maintained in compression.

6. The assembly of claim 5 wherein said opening in said band is sized so as to allow passage of a portion of said proximal end of said electrode therethrough while leaving a gap for flow of gas thereabout.

7. The assembly of claim 1 wherein said resilient element is a conductive spring, and
   further wherein said means for providing a conductive path between said contact element and said electrode via said plunger when said electrode is in the forward position includes said conductive spring.

8. The assembly of claim 7 wherein said means for providing a conductive path between said contact element and said electrode via said plunger when said electrode is in the forward position further comprises:
   a stranded conductor connected between said contact element and said plunger.

9. The assembly of claim 7 further wherein said electrode, when in the rear position, forces said plunger to a position where there is physical contact between said contact forward surface of said contact element and said plunger rear surface of said plunger, this contact providing said means for providing a consistent rear position of said electrode.

10. The assembly of claim 8 wherein said means for providing a consistent rear position of said electrode is provided by a stacked condition of said spring.

11. The assembly of claim 8 wherein said means for providing a consistent rear position of said electrode is provided by an insulating member provided on at least one of said plunger and said contact element and positioned so as to reside therebetween.

12. The assembly of claim 1 wherein said insulator is a tubular element having a passage therethrough, said passage having a central band which partitions said passage into a forward chamber configured such that said electrode can be slidably engaged therein, and a rear chamber which restrains the movement of said resilient element and said plunger, said passage having an opening defined by said central band that provides communication between said forward chamber and said rear chamber, and further wherein said central band and said opening are configured so as to allow said electrode to engage said plunger when the torch is assembled, while providing a spaced apart relationship between said plunger and said central band, and between said electrode and said central band.

13. The assembly of claim 12 further comprising:
means for preventing said electrode from entering said opening.

14. The assembly of claim 13 wherein means for providing a consistent rear position of said electrode is provided by contact between said plunger and said contact element that limits rearward travel of said plunger and said electrode when engaged therewith, and further wherein said plunger has an extension having a length L selected to block movement of said electrode into said opening when said plunger contacts said contact element.

15. The assembly of claim 14 wherein said proximal end of said electrode has a diameter $D_E$ that is larger than a diameter $D_O$ of said opening.

16. The assembly of claim 15 wherein said plunger is fabricated from a metal selected from the group of:
silver; and
silver-based alloys.

17. The assembly of claim 1 wherein said plunger is fabricated from a metal selected from the group of:
silver; and
silver-based alloys.

18. An electrode and electrode-supporting assembly for use in a contact start plasma arc torch having,
a generally cylindrical torch recess having a recess proximal end and a recess distal end;
a current-carrying cathode terminating in a contact surface located at the recess proximal end, and
a nozzle element that can be secured relative to the torch recess so as to substantially close the recess distal end, the electrode and electrode support electrode-supporting assembly comprising:
an electrode terminating in an electrode distal end that includes an emissive element and an electrode proximal end terminating at an electrode terminal surface,
said electrode moving relative to the nozzle element between a forward position, where said electrode distal end contacts the nozzle element, and a rear position, where said electrode is spaced apart from the nozzle element; and
an electrode-supporting assembly having,
a hollow insulator having a central axis, said insulator engaging the torch recess so as to be retained therein, said insulator being configured to partially enclose said electrode while allowing said electrode to move therein between the forward position and the rear position,
said insulator being further configured to allow said electrode to be freely removed therefrom when the nozzle element is removed from being secured with respect to the recess,
a contact element fabricated from a conductive material and attaching to said insulator so as to reside at the recess proximal end of the torch, said contact element further having,
a contact element proximal surface that is positioned to forcibly engage the contact surface of the cathode when said insulator is retained in the torch recess, and
a contact element distal surface,
a resilient element forcibly engaging said contact element distal surface,
a plunger fabricated from a conductive material and having,
a plunger proximal surface that forcibly engages said resilient element such that said resilient element biases said plunger away from said contact element, and
a plunger distal surface that is configured to be axially engageable with at least a portion of said electrode terminal surface of said electrode, this engagement causing said plunger to compress said resilient element when said electrode is in the electrode distal position, said plunger being interposed between said electrode and said resilient element,
means for limiting movement of said electrode towards said contact element so as to define the rear position of said electrode,
means for providing a conductive path between said contact element and said electrode via said plunger when said electrode is displaced away from its rear position,
means for providing a conductive path between said contact element and said electrode via said plunger when said electrode is in the rear position, and
means for maintaining said plunger and said resilient element connected to said contact element when said electrode is removed from said hollow insulator.

19. The assembly of claim 18 wherein said electrode terminal surface and said plunger distal surface are non-planar surfaces.

20. The assembly of claim 19 wherein said insulator has a passage therethrough, said passage having a central band which partitions said passage into a forward chamber configured such that said electrode can be slidably engaged therein, and a rear chamber which restrains the movement of said resilient element and said plunger, said passage having an opening defined by said central band that provides communication between said forward chamber and said rear chamber, and further wherein said band and said opening are configured so as to allow said electrode to engage said plunger when the torch is assembled, while providing a spaced apart relationship between said plunger and said band, and between said electrode and said band.

21. An electrode-supporting assembly for use in a contact start plasma arc torch having,
a current-carrying cathode terminating in a power transfer surface,
a torch recess, a nozzle element, an electrode having a longitudinal axis and residing in the torch recess, the electrode being axially movable between a forward position for contacting the nozzle element to start the torch and a rear position spaced apart from the nozzle element so as to maintain a plasma arc, the electrode terminating in a distal end including an emissive element and a proximal end terminating at an electrode rear terminal surface, and a retaining element for securing the nozzle element with respect to the torch recess so as to enclose the electrode therein, the electrode-supporting assembly comprising:

an insulator slidably engagable into the torch recess and configured to be retained therein by the retaining element when securing the nozzle element, said insulator being configured to receive at least a portion of the electrode therein;

a plunger fabricated from a conductive material and residing in said insulator, said plunger having, a plunger front contact surface configured so as to be releasably axially mateable with the electrode rear terminal surface of the electrode, and a plunger rear section terminating in a plunger rear surface;

a contact element configured to engage said insulator and having, an array of gas passages therethrough to allow gas flow through said contact element, a contact forward surface, and a contact rear surface, said contact element engaging said insulator such that said contact rear surface is forcibly engaged against the power transfer surface of the cathode when said insulator is retained in the torch recess;

a resilient element engaging said contact element and said plunger rear section so as to bias said plunger into engagement with the electrode, thereby biasing the electrode to its forward position, the engagement of said resilient element with said plunger being such that said plunger is interposed between said resilient element and the electrode;

means for maintaining engagement of said plunger, said resilient element, and said contact element with each other, thereby assuring said plunger and said resilient element are retained in said insulator;

means for limiting rearward travel of said plunger so as to provide a consistent rear position of the electrode; and means for providing a conductive path between said contact element and said plunger when the electrode of the torch is in the forward position; and means for providing a conductive path between said contact element and said plunger when the electrode of the torch is in the rear position.

\* \* \* \* \*